US005583868A

United States Patent [19]
Rashid et al.

[11] Patent Number: 5,583,868
[45] Date of Patent: Dec. 10, 1996

[54] METHOD AND SYSTEM FOR COMBINING DATA FROM MULTIPLE SERVERS INTO A SINGLE CONTINUOUS DATA STREAM USING A SWITCH

[75] Inventors: Richard F. Rashid, Woodinville; William J. Bolosky, Issaquah; Robert P. Fitzgerald, Redmond, all of Wash.

[73] Assignee: Microsoft Corporation, Redmond, Wash.

[21] Appl. No.: 280,190

[22] Filed: Jul. 25, 1994

[51] Int. Cl.⁶ .................................................. H04L 12/56
[52] U.S. Cl. ........................ 370/394; 370/397; 370/450
[58] Field of Search ........................... 370/60, 60.1, 94.1, 370/94.2, 85.4, 85.5, 85.6, 85.12, 94.3; 340/825.5, 825.51, 825.03, 825.02

[56] References Cited

U.S. PATENT DOCUMENTS

| | | | |
|---|---|---|---|
| 5,287,348 | 2/1994 | Schmidt et al. | 370/60.1 |
| 5,339,317 | 8/1994 | Tanaka et al. | 370/60.1 |
| 5,345,447 | 9/1994 | Noel | 370/85.13 |
| 5,359,600 | 10/1994 | Ueda et al. | 370/60.1 |

OTHER PUBLICATIONS

Newman, Peter, "ATM Technology for Corporate Networks," IEEE Communications Magazine, Apr. 1992, pp. 90–101.

Lane, Jim, "Asynchronous Transfer Mode: Bandwidth for the Future," Telco Systems, First Edition, 1992, pp. 1–37.

Breault et al. (ed.), "ATM User–Network Interface Specification," Version 2.4, Aug. 5, 1993, pp. i–xvi and 1–346.

Primary Examiner—Douglas W. Olms
Assistant Examiner—Dang Ton
Attorney, Agent, or Firm—Seed and Berry

[57] ABSTRACT

An ATM switch is used to combine blocks of data from multiple data servers into a single continuous data stream. The ATM switch is especially well adapted for use in a video-on-demand environment. Blocks of data may be striped across the data servers so that they are output from respective data servers in sequence. Transmission of data from the data servers to the ATM switch is scheduled so that the blocks of data are output in sequence without undue delay between the transmission of blocks of data from the servers. Synchronizing tokens are provided to the data servers to specify that they are to output data of a given sequence and to direct the sequence to a given virtual channel. As a result, the system of this invention appears to output single continuous data streams from the output ports of the ATM switch.

14 Claims, 8 Drawing Sheets

METHOD AND SYSTEM FOR COMBINING DATA FROM MULTIPLE SERVERS INTO A SINGLE CONTINUOUS DATA STREAM USING A SWITCH

TECHNICAL FIELD

This invention relates generally to data processing systems and, more particularly, to combining data from multiple data servers into a single continuous data stream using a switch.

1. Background of the Invention

Asynchronous transfer mode (ATM) is one of a general class of high-speed packet switching technologies that route traffic via an address contained within each packet. Asynchronous transfer mode may be contrasted with synchronous transfer mode techniques that are used in many digital telephone networks. Asynchronous transfer mode is an outgrowth of the broadband integrated services digital network (BISDN) standards that have been developed. ATM switches have been developed to control routing in ATM environments. These switches route fixed size packets, known as cells, to their intended destinations. Generally, ATM switches are used to realize a connection from a single origination point to a single destination point.

2. Summary of the Invention

In accordance with one aspect of the present invention, a method is practiced in a system that has a plurality of data servers for outputting data and an ATM switch. In this method, consecutive blocks of data in a data sequence are output from the data servers. The ATM switch is then used to combine the output blocks into a single sequential data stream.

In accordance with another aspect of the present invention, a first set of data is output from a first data server to an ATM switch. The first set of data is directed through the ATM switch to a selected output port on the ATM switch. A second set of data is output from a second data server to the ATM switch. The second set of data is also directed through the ATM switch to the selected port of the ATM switch to create a continuous stream of output with the first set of data from the selected output port.

In accordance with a further aspect of the present invention, a method is practiced in a video-on-demand server system having a plurality of data servers and a switch with input ports and output ports. In this method, a first block of data of a video image sequence is output from a first of the data servers to a first of the input ports of the switch. The first block of the video image sequence is directed through the switch to a first of the output ports. A second block of the video image sequence is output from a second of the data servers and directed through the switch to the first of the input ports to produce a continuous output data stream with the first block of the video image sequence.

In accordance with an additional aspect of the present invention, a token that identifies an output port of an ATM switch to which cells are to be output is forwarded to a first data server. The cells holding data for a first block in a data sequence are output from the first data server to the output port of the ATM switch that is identified by the token. The token is then forwarded to a second of the data servers and the cells holding data for a second block of the data sequence are output from the second data server through the output port that is identified by the token.

In accordance with yet another aspect of the present invention, a method is practiced in a system that has a plurality of servers for outputting data to an asynchronous transfer mode (ATM) switch that directs data to virtual channels. In this method, a token that identifies a virtual channel is passed to a first of the data servers. In response to the token being received at the first of the data servers, an identifier of the virtual channel is incorporated in a header that is part of the cells of a first block of data of a data sequence. The cells for the first block of data are output from the first data server to the ATM switch so that the cells are routed over the identified virtual channel. A token that identifies the virtual channel is passed through a second of the data servers. In response to receiving the token at the second data server, the second data server incorporates the identifier of the virtual channel and the header for the cells of a second block of data of the data sequence. These cells in the second block of data then output from the second data server to the ATM switch so that they are routed over the identified virtual channel.

DETAILED DESCRIPTION OF THE INVENTION

The preferred embodiment of the present invention provides a method and system for combining data originating from multiple data servers into a single continuous data stream using an ATM switch. This combining of data may be concurrently performed on multiple data sequences to produce multiple continuous output data streams. Data transmissions from the data servers are synchronized for each data sequence through a combination of the use of synchronizing tokens and time division multiplexing of outputs from the data servers. The method and system of the preferred embodiment of the present invention allows a distributed data server system, such as a video-on-demand server system, that is built out of two or more computers, to appear to a client as a single computer sending a single data stream for each data sequence. The preferred embodiment greatly simplifies downstream switching of the data stream (i.e., switching after the data leaves the server system).

The preferred embodiment of the present invention will be described below as being implemented in a video-on-demand server system. Nevertheless, those skilled in the art will appreciate that the present invention may also be practiced in other environments wherein multiple data servers produce data for a data sequence that is to be combined into a single data stream. The preferred embodiment of the present invention will also be described below as being implemented using ATM switches. Those skilled in the art will appreciate that the present invention may also be practiced using other types of switching networks. For example, the present invention may also be practiced in cell-switched networks, circuit-switched networks, and non-ATM packet switched networks.

Figure 1:
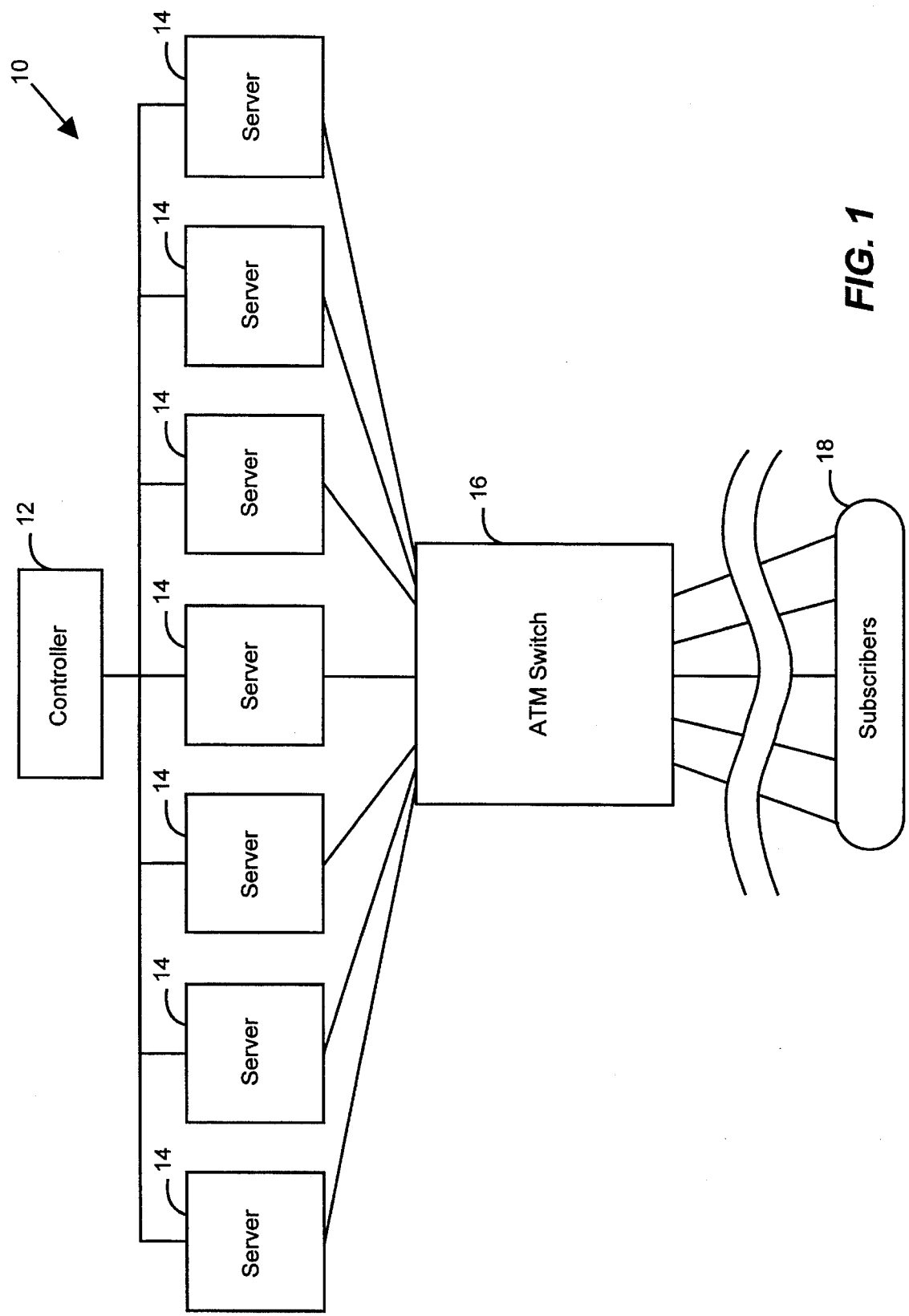
FIG. 1 is a block diagram depicting a video-on-demand server system that is suitable for practicing a preferred embodiment of the present invention.

FIG. 1 depicts a block diagram of a video-on-demand server system 10 that is suitable for practicing the preferred embodiment of the present invention. The video-on-demand server system 10 includes a controller 12 that controls the activities of a plurality of data servers 14. The output of the data servers is fed into an ATM switch 16. Each data server 14 is connected to a respective input port of the ATM switch 16. The ATM switch 16 combines data from the multiple servers 14 into data streams that are output to subscribers 18. Those skilled in the art will appreciate that in alternative embodiments the ATM switch 16 also handles input from at least one additional set of components containing a controller and servers 14. The connection between the ATM switch 16 and the subscribers 18 may include additional switching technology that is not depicted in FIG. 1. Specifically, the ATM switching network need not connect directly to the subscribers; rather, different transport mechanisms, such as television cable, telephone switching networks, local area networks, or other interconnection mechanisms may connect the outputs of the ATM switch 16 to the subscriber 18.

Each server 14 includes at least one storage device for storing blocks of the video image sequences that are available to the subscribers 18. The servers 14 may hold the video image sequences on storage devices such as magnetic disk drives, magnetic tape drives, optical disk drives, RAM, ROM, EPROM, and flash EPROMS. Each video image sequence is stored across the storage devices of the respective servers 14. Multiple copies of any video image sequence may be stored within the video-on-demand server system 10. The striping of the video image sequences increases the efficiency with which data is output by the storage devices in a fixed amount of time and helps to balance load requirements for each storage device. The consecutive blocks of each video image sequence are stored on the storage devices according to a predetermined sequence of storage devices. Nevertheless, those skilled in the art will appreciate that the present invention is not limited to embodiments wherein the data is striped across the servers 14. When striping is applied, an initial block of a video image sequence is stored on a first server, and the next block of the video image sequence is stored on a next storage device in a next one of the servers 14. The sequence of storing blocks of the video image sequence repeats itself until all the data for the video image sequence have been stored in a striping fashion across the storage devices. The previously determined sequence wraps around to the beginning when the end of the sequence is reached. The block size may vary but typically ranges between 64 K to 4 MB of data. Each block within a given data sequence has a same maximum size, but the maximum block size may vary between data sequences.

In the video-on-demand system, a subscriber 18 may request at any point in time to view a particular video image sequence that is transmitted from the servers 14 through the ATM switch 16 to the subscriber. The data for the video image sequences may contain video data, audio data and/or other types of data, including close-captioning data. The present invention may also be applied solely to video data, audio data or to other types of data sequences.

The display of video image sequences to the subscriber 18 is not pre-scheduled. Video image sequences are forwarded to the subscriber only upon demand. A subscriber need not choose a video image sequence that other subscribers are watching; rather, the subscriber may choose many of the available video image sequences that are provided by the system. Further, each subscriber chooses when he wishes to start viewing a video image sequence and may use controls, such as a pause control, a stop control, a fast forward control and a rewind control, to regulate his viewing of the video image sequence. A subscriber may select where in a sequence he desires to start viewing and stop viewing a video image sequence. A number of different subscribers may be concurrently viewing different portions of the same video image sequence. Alternatively, the video image sequences may be output not to just a single subscriber 18 but to multiple subscribers who cannot individually pause, rewind, stop or fast forward the video image sequence.

Figure 2:
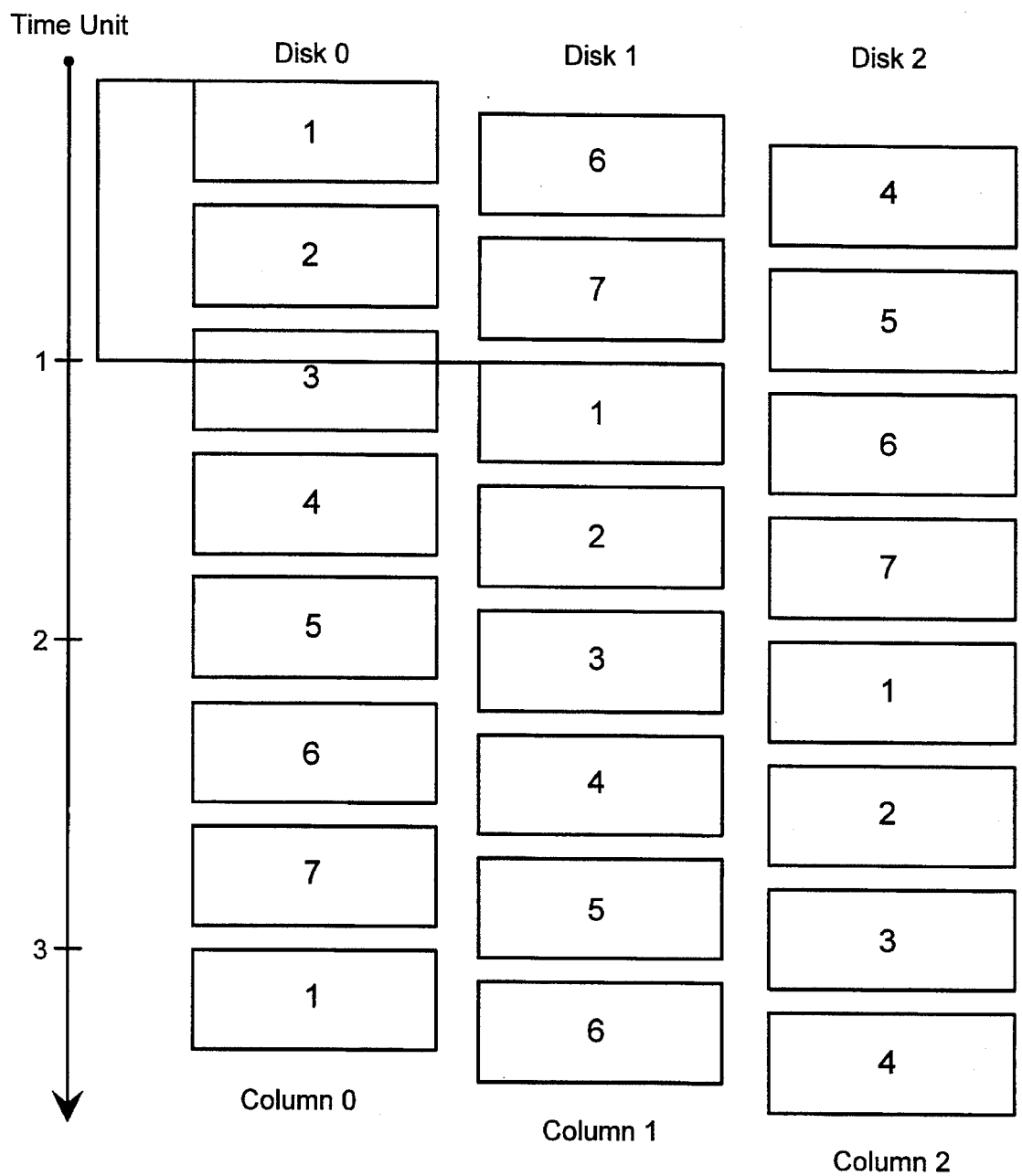
FIG. 2 is a diagram depicting the timing of the outputting of blocks of data in accordance with the preferred embodiment of the present invention.

FIG. 2 illustrates how blocks of data of video image sequences are output from the storage devices of the data servers 14. The scheduling of data transmission output from each of the disks is achieved using time division multiplexing. The scheduling is described in more detail in copending application No. 08/159,188, entitled "Method and System for Scheduling Transfer of Data Sequences," filed on Nov. 11, 1993, now Pat. No. 5,473,362 and assigned to a common assignee with the present application. The outputting of blocks of data is divided according to time slots. Each time slot is a sufficient amount of time for a disk to output a block of data. Thus, as shown in FIG. 2, disk 0 outputs a block of data in a first time slot 1 and outputs a second block of data in a second time slot. The numbers in the rectangles correspond with subscriber identifiers. Each subscriber receives a separate data stream of blocks of a video image sequence. The rectangles in FIG. 2 represent the time slots. Each time slot is of sufficient length to output an entire block of data. The outputting of data by the disk (disk 0, disk 1 and disk 2) is staggered such that at the beginning of each time unit (a measure of a master clock), a different disk begins outputting a block of data. For example, at time zero, disk 1 begins outputting a block of data that is destined for a first subscriber. At time 1, disk 1 begins outputting the next block of the video data image sequence destined for subscriber 1. It should be recalled, as mentioned above, that the blocks of a video image sequence are striped across the disks. Accordingly, these three disks (disk 0, disk 1 and disk 2) may be concurrently outputting seven separate data streams to seven separate subscribers 18.

Those skilled in the art will appreciate that the present invention is not limited to environments in which a server is output data in a predefined sequence; rather, the present invention is well adapted for use in environments wherein multiple servers output data in a non-predetermined sequence. Moreover, the present invention may also be used with non-time critical data that need not be output as a properly sequenced continuous data screen like the video data screen described above. Specifically, the present invention may be practiced in environments where the output from the data servers is not time division multiplexed.

Figure 3:
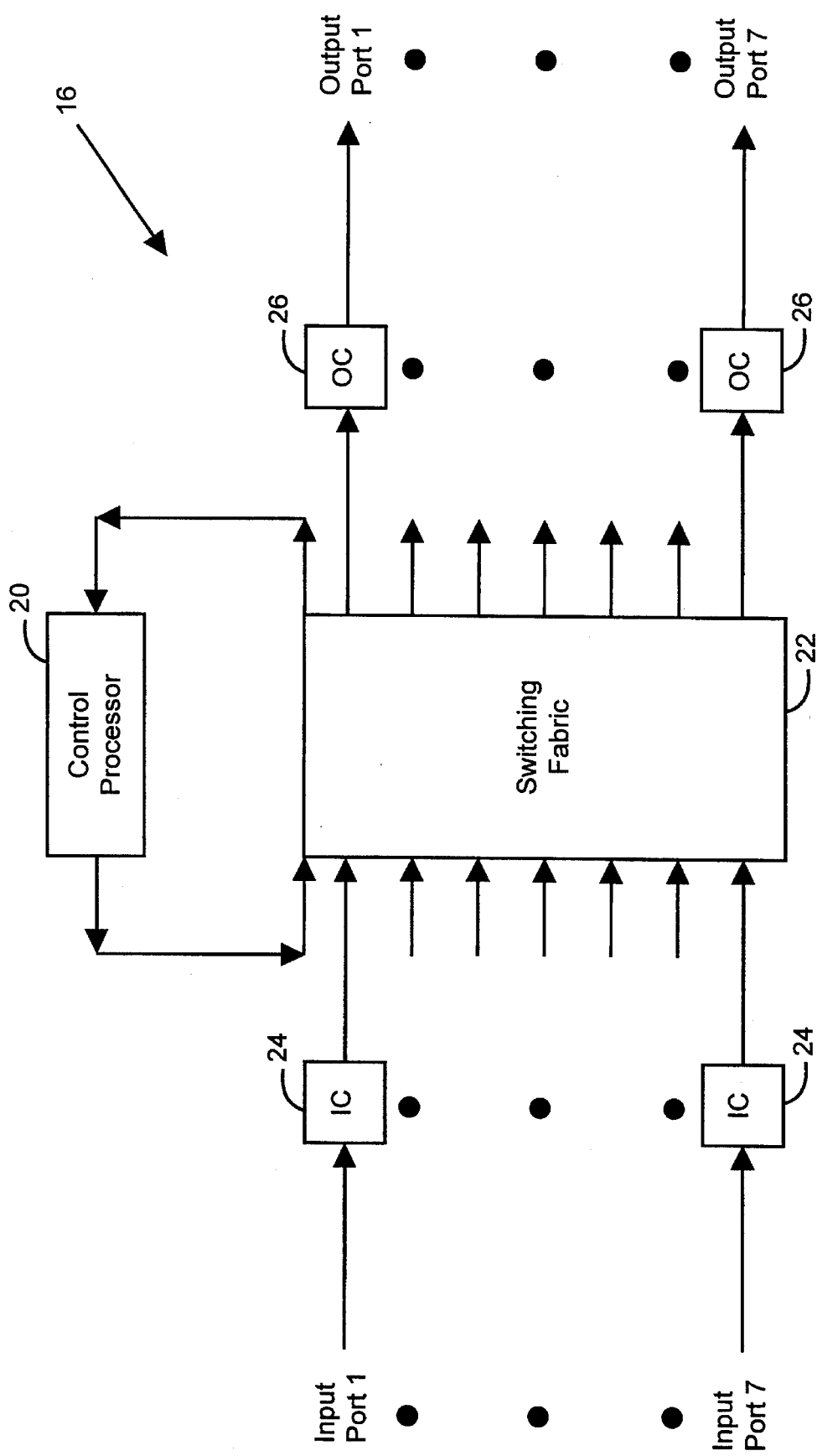
FIG. 3 is a block diagram depicting the architecture of a conventional ATM switch.

In order to appreciate how the ATM switch 16 is used to combine data from multiple data servers 14 into a single output data stream for a data sequence, it is helpful to further examine the architecture of the ATM switch 16. FIG. 3 shows the architecture of the ATM switch 16 in more detail. The ATM switch 16 includes a control processor 20, switching fabric 22, input controllers 24 and output controllers 26. In the example shown in FIG. 3, the ATM switch 16 has seven input ports, seven input controllers 24, seven output controllers 26, and seven output ports. The control processor 20 is used to implement higher level functionality that is not the concern of the present invention. Each input controller 24 is associated with a corresponding input port. The input controllers 24 receive input from the corresponding input port and manipulate the cells of information so that they are directed to the proper output port via the switching fabric 22. The input controllers 24 are responsible for examining the incoming cells that are received at the input ports and manipulating the cells so that they are properly routed to the output ports. The switching fabric 22 is comprised of a number of switching elements. The output controllers 26 control cells received from the switching fabric 22 and direct the cells to their corresponding output port.

It should be appreciated that the ATM switch configuration shown in FIG. 3 is merely illustrative. Other ATM switch designs may also be used to practice the present invention. Those skilled in the art will also appreciate that a number of different types of ATM switches are known and may be used to practice the present invention.

Figure 4:
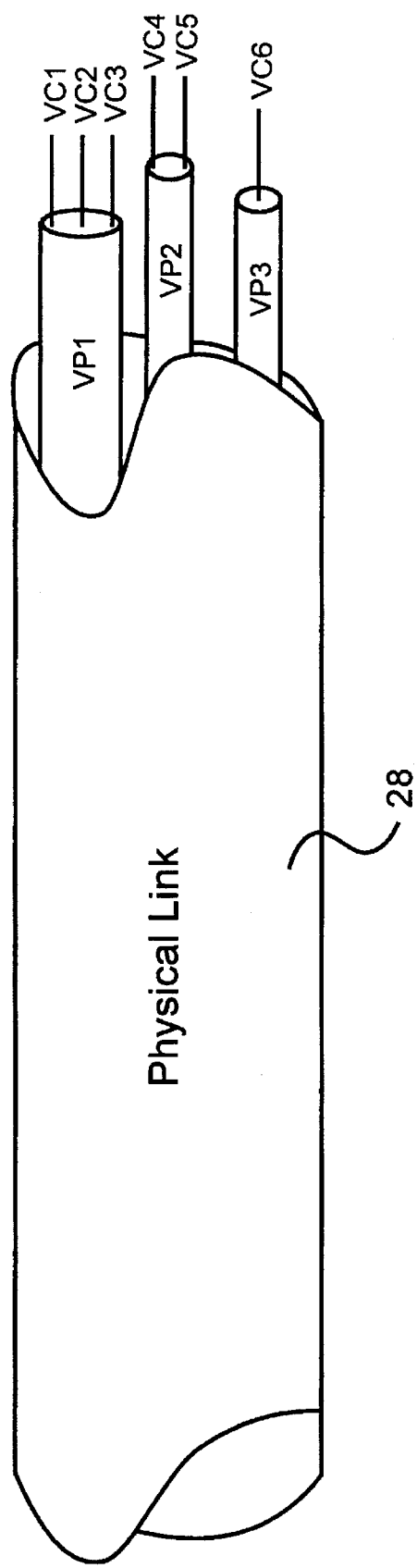
FIG. 4 is a diagram illustrating the notion of virtual paths and virtual channels in a conventional ATM environment.

In an ATM environment, routing is achieved by specifying virtual channels (VCs) and virtual paths (VPs) in cells. A "virtual channel" is a connection between two communicating ATM entities. "Virtual paths" are groups of virtual channels that are carried between two points. Virtual paths provide a convenient technique for bundling traffic that is heading for the same destination. In particular, switching equipment need only check for a virtual path identifier to relay traffic rather than checking an entire address contained within a cell. FIG. 4 shows an example of the concepts of a virtual path and virtual channel. In the example shown in FIG. 4, a physical link 28 carries traffic for three virtual paths: VP1, VP2, and VP3. Each of the virtual paths include one or more virtual channels. Specifically, VP1 includes virtual channels VC1, VC2, and VC3; VP2 includes virtual channels VC4 and VC5; and VP3 includes virtual channel VC6.

Figure 5:
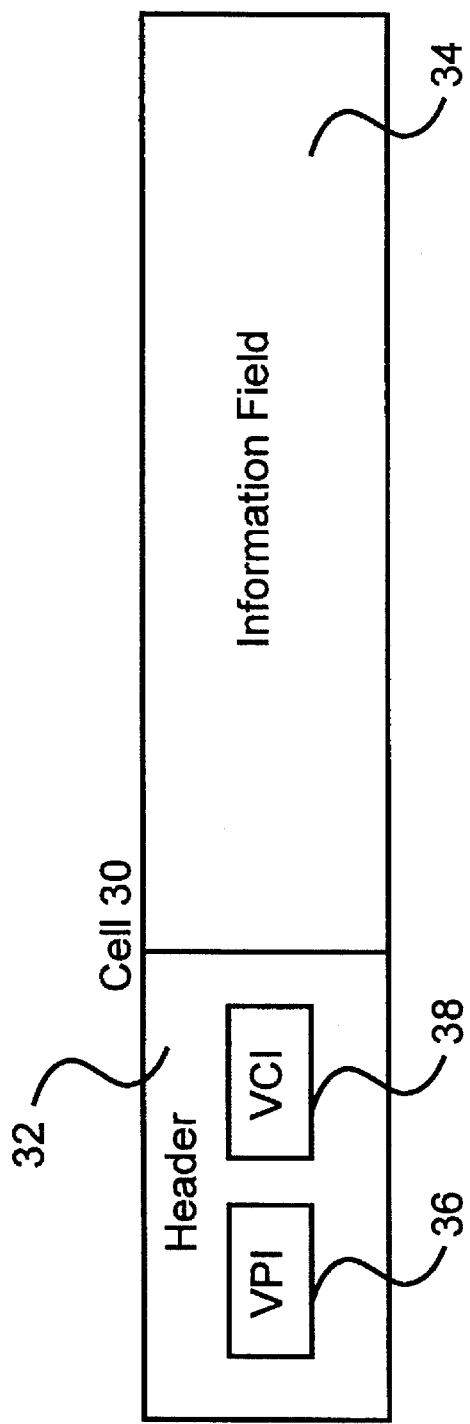
FIG. 5 is a block diagram illustrating the format of a conventional ATM cell.

As mentioned above, in an ATM network environment, all communications are packaged into fixed size cells. Each cell holds information that identifies the virtual path and virtual channel over which the cell is to be routed. Each server 14 includes a network interface card that serves as an interface to the ATM network. The ATM interface provided on the network interface card packages the blocks of data that are retrieved from the storage devices of the servers 14 into cells that are suited to be transferred to the ATM switch 16. FIG. 5 shows an example of an ATM cell. The ATM cell is 53 bytes long and includes a 5-byte header 32 and a 48-byte information field 34. The header includes a virtual path identifier (VPI) 36 and a virtual channel identifier (VCI) 38. The VPI 36 and VCI 38 are used by input controllers 24 (FIG. 3) in the ATM switch 16 (FIG. 1) to properly route cells to the output ports associated with the specified virtual paths and virtual circuits. It should be appreciated that the values of VPI and VCI stored within a cell may change as a cell is routed over an ATM network, as will be described in more detail below.

Figure 6:
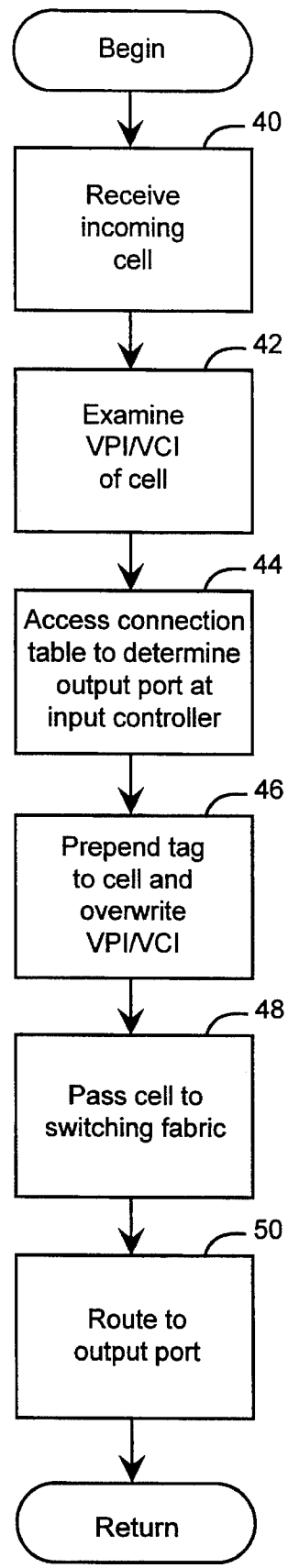
FIG. 6 is a flow chart of the steps performed to route a cell through a conventional ATM switch.

FIG. 6 is a flow chart of the steps performed in routing a cell through an ATM switch. Initially, the incoming cell is received by the ATM switch at one of its input ports (step 40). The VPI and VCI stored in the header 32 (FIG. 5) of the cell 30 are examined by the input controller 24 (FIG. 3) of the ATM switch (step 42 in FIG. 6). Each ATM switch 16 (FIG. 1) contains a connection table, which is a lookup table used to translate the set containing the input port end VPI 36 and VCI 38 in the header of a cell to a new set that includes an output port, output VPI and output VCI so that the cell may be routed over the proper path to reach its destination. The connection table stores output port identifiers that are indexed by the VPI/VCI of an incoming cell. As such, the input controller 24 (FIG. 3) accesses the connection table to determine the output port to which the cell should be destined (step 44 in FIG. 6). The connection table may take the form of a global table that is shared by the input controllers 24 or alternatively each input controller may have its own table. The input controller 24 attaches a routing tag to the cell that is used by the switching fabric 22 to determine how to route the cell to the desired output port and overwrites the VPI 36 (FIG. 5) and VCI 38 to values that are useful in the next ATM link, if any (step 46 in FIG. 6). For purposes of simplification in the present example, it is assumed that the ATM connection includes only a single link.

The cell is then passed to the switching fabric 22 (step 48 in FIG. 6) so that it may be routed to the proper output port (step 50). The switching fabric 22 may include buffers for buffering cells while they are being transmitted across the switching fabric.

In the preferred embodiment of the present invention, the blocks of data for a video image sequence that are striped across the servers 14 are merged into a single continuous data stream in the ATM switch 16 by assigning VPI/VCI values to realize such combining of the blocks of data into a single data stream and by using synchronizing tokens as described below. The cells of data for each block of data in a video image sequence are each assigned a common virtual path and virtual channel. Hence, the blocks of data for a video image sequence are directed to a same destination by the ATM switch 16. The synchronizing tokens ensure proper sequencing for cells that are output from different servers to a common virtual channel. In other words, the synchronizing tokens ensure that the cells are sent in proper order.

Figure 7:
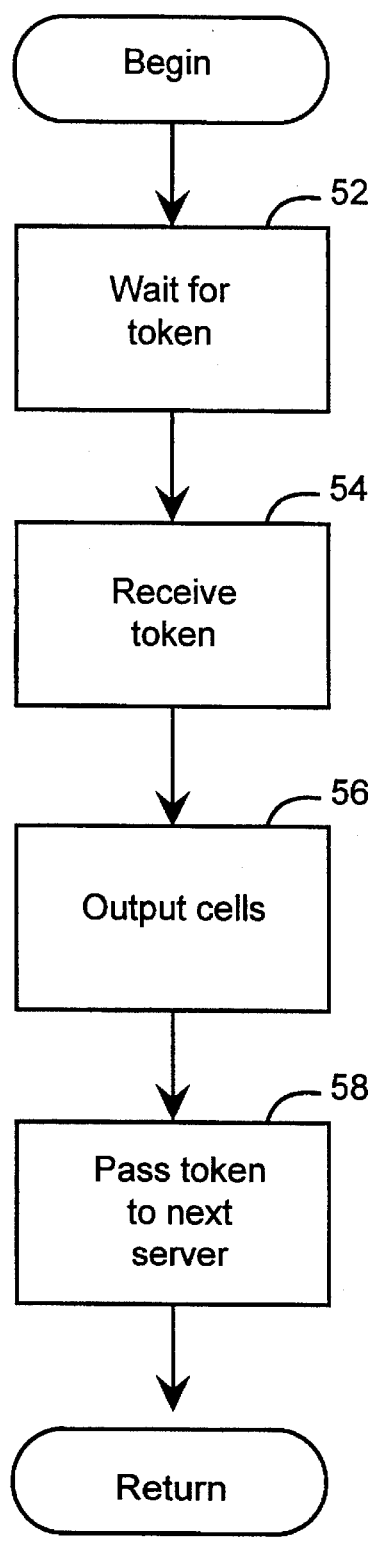
FIG. 7 is a flow chart illustrating the steps performed to combine consecutive data blocks into a continuous data stream through the ATM switch in accordance with the preferred embodiment of the present invention.

FIG. 7 is a flow chart illustrating the steps that are performed by a server 14 to output a block of data for a video image sequence. Initially a server 14 is waiting for a synchronizing token so that it can output data (step 52). The synchronizing token is then passed to the server (step 54). The server 14 emits the enabled data block as cells through its network interface card to the ATM switch 16 (step 56). Those skilled in the art will appreciate that the token may arrive before the data is ready to be output from the server or vice versa. The flow chart of FIG. 7 is merely illustrative in showing the data arriving first. The synchronizing token is then passed to the next server as the predetermined sequence of servers (i.e., the server that holds the next block of data of the video image server 10) so that the next server may emit data (step 58). Alternatively, the synchronizing token may be returned to a know location where the next server 14 will know to look. The steps of FIG. 7 are independently repeated for each of the servers 14.

A separate token is provided for each virtual channel (i.e., each output data stream). This token is passed in sequence from server 14 to server so that the blocks of video image sequence are output in proper order. The synchronizing tokens are generated by a separate serving process that may reside on one of the servers 14 or on a separate computer. This serving process is responsible for generating, managing, and deleting the tokens for each of the virtual channels that is in use.

The use of the synchronizing tokens preserves data order in the presence of variable queuing delays such as found in multistage interconnection networks. In addition, the use of the synchronizing tokens allows the present invention to work in instances where several users were on at different data rates and with different blocking factors. For example, the present invention is well-adapted to be used in an environment wherein a different number of bytes are output from the respective servers 14.

Figure 8A:
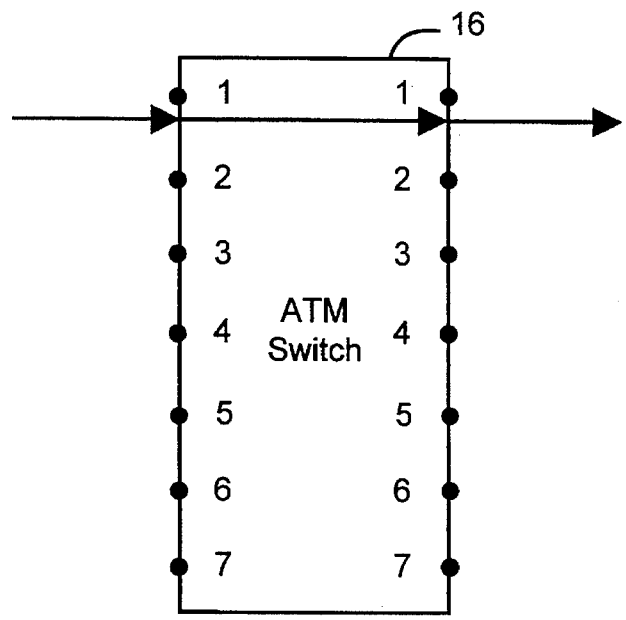
FIGS. 8A and 8B illustrate an example of operation of an ATM switch to combine consecutive blocks of data into a single, continuous data stream in accordance with the preferred embodiment of the present invention.
Figure 8B:
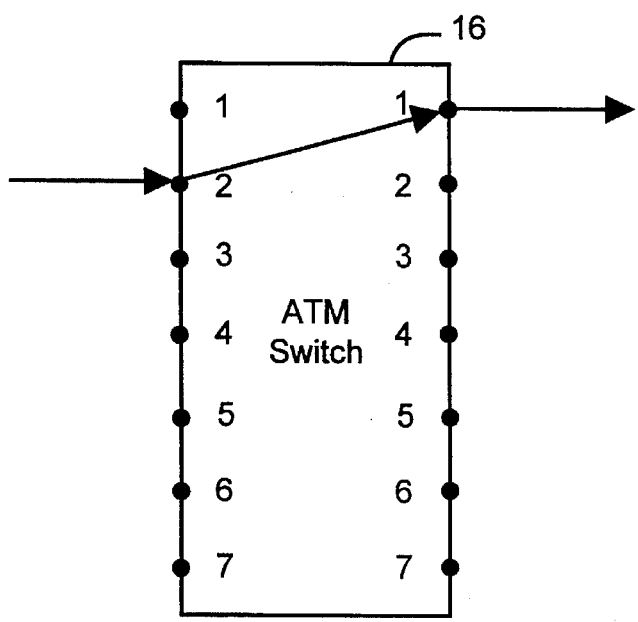

FIGS. 8A and 8B illustrate an example of the operation of the preferred embodiment of the present invention in combining data for multiple data servers into a single data stream. These steps are separately performed for each output data stream. In the example shown in FIGS. 8A and 8B, each server has an associated input port. In FIG. 8A, the server associated with input port 1 forwards cells for a first block of a video image sequence to the ATM switch 16. The cells are provided with VPI/VCI values that direct the ATM switch to forward the cells to the output port 1. During a next time frame, after all of the data for the first block of the video image sequence has been output, a token is passed to the second server that is associated with input port 2. The second server passes data via input port 2 into the ATM switch 16 and sets a switching logic so that the cells of the second block of the video image sequence are directed out output port 1. This process is repeated for the remaining servers that hold consecutive blocks of the video image sequence until the last server is reached at which point the sequence repeats itself.

While the present invention has been described with reference to a preferred embodiment thereof, those skilled in the art will appreciate the various changes in form and detail may be made without departing from the intended scope of the claims as defined in the appended claims. For example, the present invention may be implemented with different switch architectures than those described above.

We claim:

1. In a system having data servers and a virtual circuit network switch having output ports, a method comprising the steps of:

outputting a first set of data from a first of the data servers to the virtual circuit network switch;

directing the first set of data through the virtual circuit network switch to a selected output port of the virtual circuit network switch;

outputting a second set of data from a second of the data servers to the virtual circuit network switch; and directing the second set of data through the virtual circuit network switch to the selected port of the virtual circuit network switch so as to create a continuous stream of output with the first set of data from the selected output port.

2. The method of claim 1 wherein the first set of data and the second set of data are part of a same data sequence.

3. The method of claim 1 wherein the step of outputting the first set of data from the first of the data servers to the virtual circuit network switch comprises the step of outputting a first set of cells holding the first set of data and information that identifies a virtual channel to which the first set of cells are destined from the first of the data servers.

4. The method of claim 3 wherein the step of directing the first set of data through the virtual circuit network switch to the selected output port of the virtual circuit network switch includes the steps of:

examining the information in the first set of cells that identifies the virtual channel to which the cells are destined to identify the virtual channel to which the first set of cells are destined;

determining that the selected output port is associated with the virtual channel to which the first set of cells are destined; and directing the first set of cells through the virtual circuit network switch to the selected output port.

5. The method of claim 1 wherein the step of outputting the second set of data from the second of the data servers to the virtual circuit network switch comprises the step of outputting a second set of cells holding the second set of data and information that identifies a virtual channel to which the second set of cells are destined from the second of the data servers.

6. The method of claim 1 wherein the step of directing the second set of data through the virtual circuit network switch to the selected output port of the virtual circuit network switch includes the steps of:

examining the information in the second set of cells that identifies the virtual channel to which the cells are destined to identify the virtual channel to which the second set of cells are destined;

determining that the selected output port is associated with the virtual channel to which the second set of cells are destined; and directing the second set of cells through the virtual circuit network switch to the selected output port.

7. The method of claim 1 wherein the virtual circuit network switch is an asynchronous transfer mode (ATM) switch.

8. In a video-on-demand server system having a plurality of data servers and a switch having input ports and output ports, a method comprising the steps of:

outputting a first block of a video image sequence from a first of the data servers to a first of the input ports of the switch, wherein the video image sequence comprises a sequence of blocks of data;

directing the first block of the video image sequence through the switch to a first of the output ports of the switch; and outputting a second block of the video image sequence from a second of the data servers;

directing the second block of video image sequence through the switch to the first of the input ports of the switch to produce a continuous output data stream with the first block of the video image sequence from the first of the output ports.

9. The method of claim 8 wherein the video image sequence includes audio data and video data.

10. The method of claim 8 further comprising the steps of:

outputting additional blocks of the video image sequence from the data servers;

directing the additional blocks of the video image sequence through the switch to the first of the output ports to produce a continuous output stream of the blocks of the video image sequence.

11. The method of claim 8 wherein the switch is an asynchronous transfer mode switch.

12. In a computer system having data servers and a switch with output ports, a method of outputting a sequence of blocks of data comprising the steps of:

forwarding a token to a first of the data servers, said token identifying an output port of the switch to which cells are to be output;

in response to receiving the token, outputting cells holding data for a first block in the sequence from the first of the data servers to the output port of the switch that is identified by the token;

forwarding the token to a second of the data servers; and in response to receiving the token, outputting cells holding data for a second block in the sequence from the second of the data servers to the output port of the switch that is identified by the token.

13. The method of claim 12 wherein the switch is an asynchronous transfer mode switch.

14. In a system having a plurality of servers for outputting data to an asynchronous transfer mode (ATM) switch that directs data to virtual channels, a method comprising the steps of:

passing a token that identifies a virtual channel to a first of the data servers;

in response to receiving the token at the first of the data servers, incorporating an identifier of the virtual channel in a header that is incorporated into cells of a first block of data of a data sequence;

outputting the cells for the first block of data from the first of the data servers to the ATM switch so that the cells for the first block of data are routed over the identified virtual channel;

passing the token that identifies the virtual channel to a second of the data servers;

in response to receiving the token at the second of the data servers, incorporating the identifier of the virtual channel in a header that is incorporated into cells of a second block of data of the data sequence; and outputting the cells from the second block of data from the second of the data servers to the ATM switch so that cells for the second block of data are routed over the identified virtual channel.

* * * * *

UNITED STATES PATENT AND TRADEMARK OFFICE
CERTIFICATE OF CORRECTION

PATENT NO.  : 5,583,868
DATED       : December 10, 1996
INVENTOR(S) : Richard F. Rashid et al.

It is certified that error appears in the above-indentified patent and that said Letters Patent is hereby corrected as shown below:

In column 8, claim 6, line 15, please delete "1" and insert therefor --5--.

Signed and Sealed this

Twenty-second Day of April, 1997

Attest:

BRUCE LEHMAN

*Commissioner of Patents and Trademarks*

*Attesting Officer*